Patented Mar. 12, 1935

1,994,213

UNITED STATES PATENT OFFICE 1,994,213

PROCESS FOR MANUFACTURE OF SODIUM AURO-THIOMALATE

Marcel Delépine, Paris, France, assignor to Societe des Usines Chimiques Rhone-Poulenc, Paris, France No Drawing. Application June 29, 1934, Serial No. 733,119. In Great Britain July 7, 1933

3 Claims. (Cl. 260—11)

The present invention relates to the production of a therapeutically useful gold compound. It has for its object the production of a stable gold compound readily soluble in water, which can be sterilized without decomposition.

It has long been known that complex gold compounds can be formed from organic bodies containing the group SH. In order to be suitable for therapeutic use, such complex compounds should fulfill various conditions which are very rarely found united in a single substance. The organic substance containing the SH group should be easy to obtain in a state of purity; the complex gold compound which is derived from it should be sufficiently stable so that its aqueous solutions can be sterilized and kept in ampoules; it should be able to be used for intramuscular injections, and its use should be attended with no practical difficulties.

According to the present invention I have demonstrated that sodium auro-thiomalate fulfills all the above-named necessary conditions. In particular, although the derivatives of the mono-carboxylic-aliphatic acids containing the SH group are liquid, thiomalic acid on the contrary crystallizes very well and can be obtained in a perfectly pure condition. Also the aqueous solutions of the complex gold compound formed from it can be made to undergo Tyndallization without difficulty.

The researches carried out by me have shown that this new product is a perfectly well defined chemical compound.

This compound may be prepared by the following method:

15 grams of pure thiomalic acid prepared according to the method of Biilmann (Liebig's Annalen, vol. 339, page 371) are neutralized with 12 grams of sodium hydroxide in aqueous solution so as to obtain a total volume of 200 cc. The solution is mixed in the cold with 32.4 grams of freshly prepared gold iodide suspended in 200 cc. of water. The gold iodide dissolves with the formation of sodium auro-thiomalate and sodium iodide. By adding 400 cc. of ethyl alcohol, the auro-thiomalate is precipitated in the form of an oily liquid while the sodium iodide remains in solution. This oily liquid is dissolved in water and precipitated again by alcohol; finally, the precipitate obtained is dissolved for a last time in the least possible quantity of water; to this solution an equal volume of glycerine is added, and the whole is added to an excess of methyl alcohol. The solid thus precipitated is washed with methyl alcohol and dried.

The sodium auro-thiomalate thus obtained has the form of a white powder showing a yellowish-green tinge by reflected light.

This substance is hygroscopic and exceedingly soluble in water. It is, on the contrary, very nearly insoluble in alcohols and in ether. Its analysis agrees with the formula:

$$CO_2Na-CH_2-CH(SAu)-CO_2Na.H_2O$$

which requires 48.28% of gold, whereas the analysis gave 48.36% of gold.

Sodium auro-thiomalate is indefinitely stable in the solid state and it is a remarkable fact that its aqueous solutions can be Tyndallized without undergoing any decomposition. In this way sterilized aqueous solutions can be obtained ready for use and containing up to 10% of gold.

What I claim and desire to secure by Letters Patent is:—

1. Process for the manufacture of sodium auro-thiomalate by causing sodium thiomalate to react in aqueous solution with gold iodide.

2. As a new article of manufacture sodium auro-thiomalate having the composition $$C_4H_3O_4SAuNa_2.H_2O.$$

3. Tyndallized sterile aqueous solutions of sodium auro-thiomalate containing up to 10% or more of gold.

MARCEL DELÉPINE.